United States Patent Office 3,197,603
Patented July 27, 1965

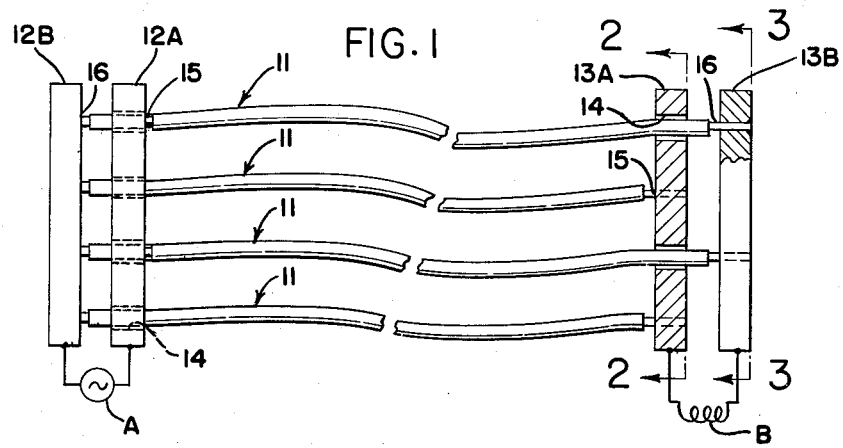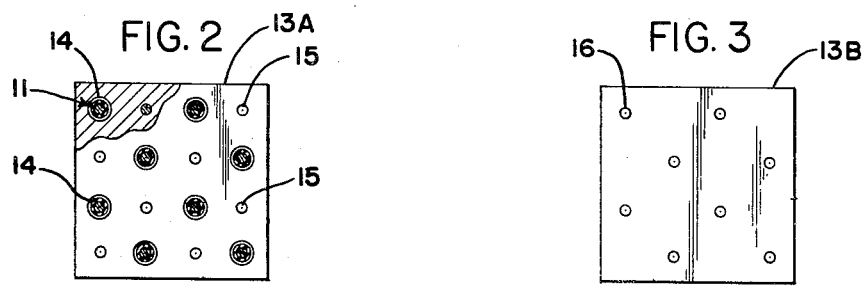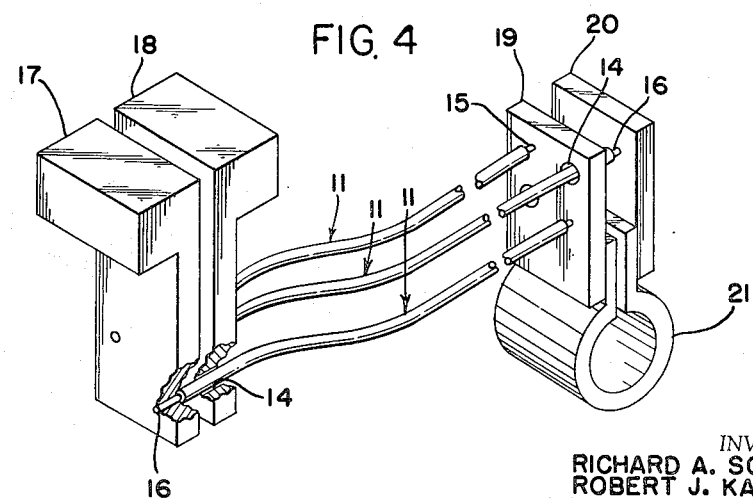
INVENTORS.
RICHARD A. SOMMER &
ROBERT J. KASPER
BY
ATTORNEYS

3,197,603
ELECTRICAL CONNECTIONS FOR HIGH
FREQUENCY TRANSMISSION LINES
Richard A. Sommer, Parma, and Robert J. Kasper, Seven
Hills, Ohio, assignors to The Ohio Crankshaft Company, Cleveland, Ohio, a corporation of Ohio
Filed Sept. 4, 1962, Ser. No. 221,221
4 Claims. (Cl. 219—10.75)

This invention pertains to the art of electrical connectors and more particularly to an electrical connection for high frequency transmission lines.

The invention is particularly applicable to electrical connections for high frequency transmission lines used to transmit power from a fixed terminal to a movable terminal in induction heating devices and it will be described with particular reference to such an application; however, it is to be understood that the invention has broader applications and may be used with equal success in connecting high frequency transmission lines in various devices.

In the art of high frequency induction heating, it is sometimes necessary to supply high frequency power to a movable load. This movable load can be a tilting furnace coil, an inductor on a movable fixture or a heating coil movable from one position to another. In the past, the transmission of power to this type of a load caused serious problems of cooling the lines and maintaining low self-inductance in the lines. To prevent serious overheating of the lines, many arrangements of air cooled or water cooled cables have been provided. Generally these arrangements have been in the form of large cables interposed in side-by-side relationship to reduce the self-inductance of the transmission lines and spaced apart to allow air circulation for cooling. If the current and voltage were sufficiently high, water cooled large cables were used.

It has been considered necessary to use the large diameter cables because of the large currents handled by the cables between the transformer and inductor especially in a high frequency installation. Further, large cables were required to keep the number of connections to a minimum. The large cables have limited the application of high frequency energy in some instances because the large cables were not sufficiently flexible to allow proper movement of the load. Further, these large cables have increased the cost of the heating installations considerably because they often required water cooled bus bars that are difficult to provide on the moving load.

Still another disadvantage of the water cooled heavy cables used in the past, was that the end fittings were difficult to seal properly and considerable maintenance was required to prevent leakage at the water connection between the cables and the movable load. Further, the water connections of these large cables caused high electrical losses.

Still another disadvantage of the larger cables was their limited current carrying capacity per cross sectional area which limitation required a greater cross-section of cable to handle a given current. For instance, tests have shown that a given quantity of high frequency current can be transmitted over a lesser cross sectional area of small diameter cables than required by larger diameter cables. This factor alone indicates that the use of smaller cables is advantageous, however, past experience brought out disadvantages with cooling, expensive construction of end terminals and problems of servicing which were combined to discourage the use of the electrically more desirable smaller cables or conductors.

The present invention contemplates a connector for small conductors or cables which keep the self-inductance to a minimum, provides greater ampere-carrying capacity, is more flexible, and can be connected in a convenient, easy and inexpensive manner.

In accordance with the present invention an apparatus is provided for conducting high frequency electrical energy. This apparatus includes a number of small flexible conducting cables arranged to be connected at either end to a set of conducting bus bars. The set comprises a first and second bar generally spaced from each other and mutually parallel. The first bus bar comprises means for connecting a first group of the cables and clearance means for allowing the rest of said cables to pass therethrough. Further, the second bus bar has means for connecting thereto the cables passing through the first bus bar. With this arrangement a number of small electrical cables can be used to provide lower self-inductance throughout the length of the transmission lines which provides greater current carrying capability.

The principal object of the invention is the construction of terminals for high-frequency transmission lines that allow the use of small flexible electrical cables, arranged to take advantage of their lower self-inductance and greater electrical current-carrying capacity.

Another object of the present invention is the provision of an electrical connector for multi-cable, high-frequency transmission lines that eliminate complicated fittings at the terminals, reduces error in assembly and eliminates electrical difficulties at the ends of the lines. If maintenance is ever required, it is easily taken care of without requiring special tools or techniques.

Still another object of the invention is the use of terminal ends that are easy and inexpensive to make, can be assembled readily, and can be maintained without expensive teardown and rework of the terminal ends.

These and other objects and advantages will become apparent from the following description used to illustrate the preferred embodiment of the invention as read in connection with the accompanying drawings in which:

FIGURE 1 is a partially cross-sectioned side elevational view of the preferred embodiment;

FIGURE 2 is a partial cross-sectional view taken along line 2—2 of FIGURE 1;

FIGURE 3 is an end view taken along line 3—3 of FIGURE 1; and

FIGURE 4 is a perspective view showing the preferred embodiment of FIGURE 1.

Referring now to the drawings, wherein the showings are for the purpose of illustrating a preferred embodiment of the invention only and not for the purpose of limiting same, FIGURE 1 shows a number of small flexible cables 11, which complete the electrical circuit between one set of bus bars 12A and 12B connected onto outlet leads of high-frequency generator A and another set of bus bars 13A and 13B connected in appropriate manner to heating coil B. One half of the cables 11 are connected onto one side of the electrical circuit between generator A and coil B and the other half of cables 11 are connected onto the other side of the electrical circuit thereby completing a circuit between these components. It is also to be noted that in high frequency applications the use of a number of cables is best applied when arranged in "interposed" relationship. "Interposed" is here used to mean that the cables are paired and arranged so that adjacent cables are of the opposite electrical polarity; therefore, one cable 11 is positive, then the next is negative, then the next positive, etc. This arrangement provides that any one cable carrying current at any instant is surrounded by cables carrying current of the opposite polarity. This has been found to be the best arrangement for carrying high frequency currents, because the opposed fields in adjacent cables reduce the self-inductance of the line.

The cables 11 when connected in accordance with the present invention can maintain their interposed relationship throughout the entire length of the cables. This is possible because of the manner connecting the cables to respective bus bars. At points 15 cables 11 in one group carrying current in one direction are each connected onto bus 12A and the other group of cables carrying current in the opposite direction are each connected onto bus bars 13A at points 15. The ends of the cables not connected at points 15 pass through clearance holes 14 and are connected onto bus bars 12B and 13B at points 16 which are generally aligned with the clearance holes 14. Other means could be provided for allowing the cables to pass through the first bus bar and to the second where these are connected.

In FIGURE 4 is shown a simplified illustration of an arrangement constructed in accordance with the present invention. Bus bars 17 and 18 are shown adapted to be connected to an output transformer or generator A of a high frequency work station. A cutaway portion of the bus bars 17 and 18 shows how a cable 11 is passed through a hole 14 in bus bar 18 and connected onto bus bar 17 at point 16. At the other end of the cable there is shown bus bars 19 and 20 that are in turn connected to an inductor 21 comparable to coil B that is used for induction heating purposes. Four cables are here shown for the purpose of clarity and the connection at bus bars 19 and 20 is the same as at bus bars 17 and 18. It is appreciated that a greater number of paired cables can be used.

By this type of connection at the bus bars, the cables 11 are maintained in side-by-side relationship for the complete span of the cables. This results in a lower self-inductance than would be required if the cables had to be separated at their ends to make the connections with the bus bars.

As an example of the power transmitted on lines connected in accordance with the present invention, one installation using 3 kc. power was checked and it was noted that 50 pairs of 10 A.W.G. stranded interposed cables were used with 10 rows of cable with 10 cables in each row. The high frequency source was a three thousand cycle test stand through an 18:1 transformer ratio and was used to heat a water cooled load on a 10 minute on, then a 10 minute off, cycle. Temperature rise of the cable was approximately thirty seven degrees Fahrenheit (37° F.), after the cycle had been established with the 10 minute on, 10 minute off, cycle. Calculations from meter reading indicate that over two thousand amperes were transmitted at a minimum voltage drop of .35 volt in a three foot length.

It can be seen that the power transmitted resulted in a minor loss of power through the cables and yet provided a flexible, non-water cooled, means of power transmission. From the disclosure and the example cited it is obvious that the invention has many applications not considered applicable in the past. The disclosure is a preferred embodiment of the invention and the numerous modifications and alterations possible within the scope of the invention are considered as part thereof.

Having thus described our invention, we claim:

1. A high frequency heating apparatus comprising a source for generating a high frequency current, said source having a first and second output lead, an inductor movable with respect to said source, said inductor having a first and second input lead, a first pair of terminal blocks substantially fixed with respect to said source with one of said blocks being connected to said first output lead and the other of said blocks being connected to said second output lead, a second pair of terminal blocks substantially fixed with respect to said movable inductor with one of said blocks of said second pair being connected to said first input lead and the other block of said second pair being connected to said second input lead, a plurality of pairs of small flexible cables extending between said pairs of blocks with the first cable of each pair of cables connecting one of the blocks of each pair of blocks and the second cable of each pair of cables connecting the other blocks of each pair of blocks, said terminal blocks of each pair being generally parallel with respect to each other, said first cable for each pair of cables passing through and being insulated from one block of said first pair of blocks and being connected to the other block of said first pair of blocks.

2. A high frequency heating apparatus as defined in claim 1 wherein said second cables of each pair of cables pass through and are insulated from one block of said second pair of blocks and are connected to said other block of said second pair of blocks.

3. A high frequency heating apparatus as defined in claim 1 wherein said pairs of cables are grouped with the first cable of a majority of pairs of cables being adjacent at least three of said second cables.

4. A high frequency heating apparatus as defined in claim 1 wherein said pairs of cables are grouped with the first cable of a majority of pairs of cables being adjacent at least four of said second cables with said second cables being symmetrically arranged with respect to said first cable.

References Cited by the Examiner

UNITED STATES PATENTS

| | | | |
|---|---|---|---|
| 2,640,092 | 5/53 | Fett et al. | 174—32 X |
| 2,912,476 | 11/59 | Aschoff | 13—10 |
| 2,946,934 | 7/60 | Caputo | 165—80 |
| 3,078,325 | 2/63 | Dillon et al. | 307—147 X |

RICHARD M. WOOD, *Primary Examiner.*

DONNELL L. CLAY, *Examiner.*